(12) United States Patent
Kisela et al.

(10) Patent No.: US 9,914,659 B2
(45) Date of Patent: Mar. 13, 2018

(54) PROCESS AND APPARATUS FOR COLORING GLASS CONTAINERS

(71) Applicant: Owens-Brockway Glass Container Inc., Perrysburg, OH (US)

(72) Inventors: David Kisela, Sylvania, OH (US); Michael J. Lonsway, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 15/607,175

(22) Filed: May 26, 2017

(65) Prior Publication Data

US 2017/0260080 A1   Sep. 14, 2017

Related U.S. Application Data

(62) Division of application No. 14/842,394, filed on Sep. 1, 2015, now Pat. No. 9,663,393.

(51) Int. Cl.
*C03B 32/00* (2006.01)
*C03C 4/02* (2006.01)

(52) U.S. Cl.
CPC ............... *C03B 32/00* (2013.01); *C03C 4/02* (2013.01)

(58) Field of Classification Search
CPC ....... C03B 29/08; C03B 9/3875; C03B 29/06; C03B 25/06; C03B 32/00; C03C 4/02
USPC .......................................................... 65/111
See application file for complete search history.

(56) References Cited

U.S. PATENT DOCUMENTS

| | | | |
|---|---|---|---|
| 2,254,227 A | 9/1941 | Lewis | |
| 2,290,763 A | 7/1942 | Mueller | |
| 2,375,944 A | 5/1945 | Quentin | |
| 2,512,929 A | 6/1950 | Galbraith et al. | |
| 2,561,529 A | 7/1951 | Mongan, Jr. et al. | |
| 2,653,419 A | 9/1953 | Brenner et al. | |
| 2,669,069 A | 2/1954 | Merrill | |
| 2,672,423 A | 3/1954 | Bobdell et al. | |
| 3,293,052 A | 12/1966 | Sawchuk et al. | |
| 3,429,742 A | 2/1969 | Grego et al. | |
| 3,476,543 A | 11/1969 | Dorsey | |
| 3,489,588 A | 1/1970 | Mansur et al. | |
| 3,502,454 A | 3/1970 | Shonebarger | |
| 3,513,003 A | 5/1970 | Hammer et al. | |
| 3,535,070 A | 10/1970 | Francel et al. | |
| 3,627,548 A | 12/1971 | Hammer et al. | |
| 3,645,778 A | 2/1972 | Nesteruk | |
| 3,663,793 A | 5/1972 | Petro et al. | |
| 3,703,363 A * | 11/1972 | Heaton ................... C03B 9/12 65/184 |
| 3,741,554 A * | 6/1973 | Clark ..................... C03B 29/06 432/146 |
| 3,741,744 A * | 6/1973 | Bowman ................. C03B 25/06 118/324 |
| 3,779,734 A | 12/1973 | Simonfi et al. | |
| 3,809,544 A * | 5/1974 | Bowman ................. C03B 25/06 65/119 |
| 3,816,088 A * | 6/1974 | Yakubek ................. C03B 29/06 65/244 |
| 3,887,348 A | 6/1975 | Plumat et al. | |
| 3,934,993 A * | 1/1976 | Bowman .............. B65G 37/005 118/63 |
| 3,967,040 A | 6/1976 | Plumat et al. | |
| 4,036,624 A | 7/1977 | Krohn et al. | |
| 4,072,490 A | 2/1978 | Illig | |
| 4,075,024 A | 2/1978 | Armistead | |
| 4,076,395 A | 2/1978 | Deeg et al. | |
| 4,080,051 A | 3/1978 | Krohn et al. | |
| 4,101,302 A | 7/1978 | Krohn et al. | |
| 4,149,868 A | 4/1979 | Deeg | |
| 4,154,590 A | 5/1979 | Menyhart | |
| 4,155,734 A | 5/1979 | Krohn | |
| 4,160,655 A | 7/1979 | Kingsbury, Jr. et al. | |
| 4,213,772 A | 7/1980 | Lemker et al. | |
| 4,251,278 A | 2/1981 | Hares | |
| 4,431,692 A | 2/1984 | Hofmann et al. | |
| 4,534,780 A | 8/1985 | Cemin | |
| 4,614,530 A | 9/1986 | Sukkar | |
| 4,668,268 A | 5/1987 | Lindner et al. | |
| 4,854,957 A | 8/1989 | Borrelli et al. | |
| 5,176,733 A | 1/1993 | Koss | |
| 5,992,612 A | 11/1999 | Sidler et al. | |
| 6,171,762 B1 | 1/2001 | Borrelli et al. | |
| 7,553,156 B2 | 6/2009 | Doudement | |
| 7,612,003 B2 | 11/2009 | Lefevre et al. | |
| 8,464,558 B2 | 6/2013 | Abensour et al. | |
| 8,541,055 B2 | 9/2013 | Kutileki et al. | |
| 2009/0104387 A1 * | 4/2009 | Postupack ............. C03C 17/005 428/34.6 |
| 2011/0155685 A1 * | 6/2011 | Kutilek ................. C03C 17/005 215/12.2 |
| 2011/0289971 A1 | 12/2011 | Brown et al. | |
| 2011/0289972 A1 | 12/2011 | Brown et al. | |
| 2011/0289973 A1 | 12/2011 | Lockhart et al. | |

(Continued)

FOREIGN PATENT DOCUMENTS

| | | |
|---|---|---|
| CA | 739404 | 7/1966 |
| GB | 1065732 A | 4/1967 |
| GB | 1242336 | 8/1971 |

OTHER PUBLICATIONS

PCT Search Report and Written Opinion, Int. Serial No. PCT/US2016/045481, Int. Serial No. Aug. 4, 2016, Applicant: Owens-Brockway Glass Container Inc., dated Oct. 17, 2016.

*Primary Examiner* — Mark Halpern

(57) ABSTRACT

A process and an apparatus for imparting coloration to a glass container having a strikable glass container composition. One or more portions of the glass container are selectively and locally exposed to a temperature at or above a glass container striking temperature to affect a color change in the one or more portions of the glass container. The coloration process may be carried out by passing the glass container through an interior of an apparatus having a heating system configured to locally heat a first region within the interior to a temperature at or above a glass container striking temperature and a cooling system to locally cool a second region within the interior to a temperature below the glass container striking temperature.

20 Claims, 3 Drawing Sheets

(56) References Cited

U.S. PATENT DOCUMENTS

| | | |
|---|---|---|
| 2011/0289974 A1 | 12/2011 | Brown et al. |
| 2011/0289975 A1 | 12/2011 | Brown et al. |
| 2011/0289976 A1 | 12/2011 | Brown |
| 2011/0289977 A1 | 12/2011 | Ringuette et al. |
| 2011/0289978 A1 | 12/2011 | Ringuette et al. |
| 2014/0109619 A1* | 4/2014 | Pontes .................. C03B 9/3891 65/111 |
| 2014/0117240 A1* | 5/2014 | Smith ..................... C03C 3/087 250/341.1 |
| 2014/0120278 A1* | 5/2014 | Ordway .................... C03C 4/02 428/34.4 |
| 2014/0174127 A1* | 6/2014 | Dalstra .................. G01N 25/72 65/29.11 |
| 2015/0037503 A1* | 2/2015 | Chisholm ............... B05C 13/02 427/282 |

* cited by examiner

PROCESS AND APPARATUS FOR COLORING GLASS CONTAINERS

The present disclosure is directed to glass containers and, more particularly, to coloring of glass containers.

BACKGROUND AND SUMMARY OF THE DISCLOSURE

Glass containers and other articles are often composed of so-called soda-lime glass, also called soda-lime-silica glass or "SLS" glass. The glass used to make such articles may be colored, for example, to provide the articles with various aesthetic or functional properties. Colored glass can be produced by introducing one or more colorants, e.g., metals or metal oxides, into the glass during its manufacture. Oftentimes, the added colorants will immediately impart color to the glass. But sometimes color may need to be developed in the glass by subjecting the formed glass articles to a heat-treatment process known as "striking." This heat-treatment process may involve heating the glass articles to a temperature above their normal annealing temperature for a sufficient amount of time for the colorants in the glass to interact or "strike" and visibly change the color of the glass.

"Color" is an aspect of an object that can be described in terms of its hue, saturation, and value, and these properties of color can be used to distinguish differences in color. Thus, a "color change" or "change in color" occurs when the hue, saturation, and/or value of a color is changed. Such a change is "visible" if it can be detected by an average human viewer at an arm's length viewing distance or another convenient distance, without special viewing equipment. The term "coloration," as used herein, means the overall visual appearance of an object or a portion of an object with regard to color.

A general object of the present disclosure, in accordance with one aspect of the disclosure, is to provide a process for heat-treating a glass container having a strikable glass container composition to impart coloration to the glass container. One or more portions of the container are selectively and locally exposed to a temperature at or above a glass container striking temperature to affect a color change in the one or more portions of the glass container. An apparatus is also provided that is configured out carry out such processes.

The present disclosure embodies a number of aspects that can be implemented separately from or in combination with each other.

A process for imparting coloration to a glass container in accordance with one aspect of the disclosure includes: (a) providing a glass container having a strikable glass container composition, and (b) exposing a selective portion of the glass container to a temperature at or above a glass container striking temperature for a time sufficient to affect a color change in at least the selective portion of the glass container. The selective portion of the glass container may be exposed to a temperature at or above a glass container striking temperature for a time sufficient to establish a temperature gradient in the glass container and to produce a gradient of color in the glass container. Step (b) may involve passing the glass container through an interior having a vertical temperature profile that includes a relatively hot zone and a relatively cool zone.

In accordance with another aspect of the disclosure, there is provided a process for imparting coloration to a glass container that includes: (a) providing a glass container having a strikable glass container composition, (b) introducing the glass container into an environment having a substantially uniform temperature, and (c) locally heating or cooling discrete portions of the glass container to affect a color change or to prevent a color change from occurring in the discrete portions of the glass container.

An apparatus for imparting coloration to a glass container in accordance with one aspect of the disclosure includes: an interior, a support to support a glass container within the interior, a heating system to locally heat a first region within the interior to a temperature at or above a glass container striking temperature, and a cooling system to locally cool a second region within the interior to a temperature below the glass container striking temperature. When a glass container having a strikable glass container composition is passed through the interior, a first portion of the glass container is selectively and locally heated to a temperature at or above the glass container striking temperature such that a color change is produced in the first portion of the glass container, and a second portion of the glass container is selectively and locally maintained at a temperature below the glass container striking temperature such that the second portion of the glass container does not change color when the glass container is passed through the interior.

In accordance with another aspect of the disclosure, there is provided an apparatus for imparting coloration to a glass container. The apparatus includes: an interior, a support to support a glass container within the interior, a plenum extending across the interior, and a manifold in fluid communication with an opening in the plenum. The manifold extends from the plenum at least partway into the interior and has one or more orifices through which a gaseous medium can flow between the plenum and the interior. Each orifice of the manifold is configured to direct a gaseous flow at a discrete portion of a glass container to affect a color change or to prevent a color change from occurring in the discrete portion of the glass container.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

The apparatus and process of the present disclosure can be used to impart coloration to a glass container that has been formed from a strikable glass container composition. The term "strikable," as used herein, refers to glass containers and glass container compositions that are formulated to undergo a visible color change when they are heated at or above a certain temperature known as a striking temperature.

It should be noted that the "striking temperature" of a glass container or a glass container composition may not consist of one specific temperature, but may include a range of temperatures. In such case, heating the glass container for a sufficient amount of time at any temperature within the striking temperature range will change the color of the glass, but the value or lightness of the color produced in the glass may vary. For example, if the glass is heated at a relatively low temperature within the striking temperature range then a relatively light color may be produced in the glass, but if the glass is heated at a relatively high temperature within the striking temperature range then a relatively dark color may be produced. Also, the time required to affect a desired color change within the glass may vary depending upon the specific temperature within the striking temperature range at which the glass is heated, as well as the thickness of the glass being heated.

Figure 1:
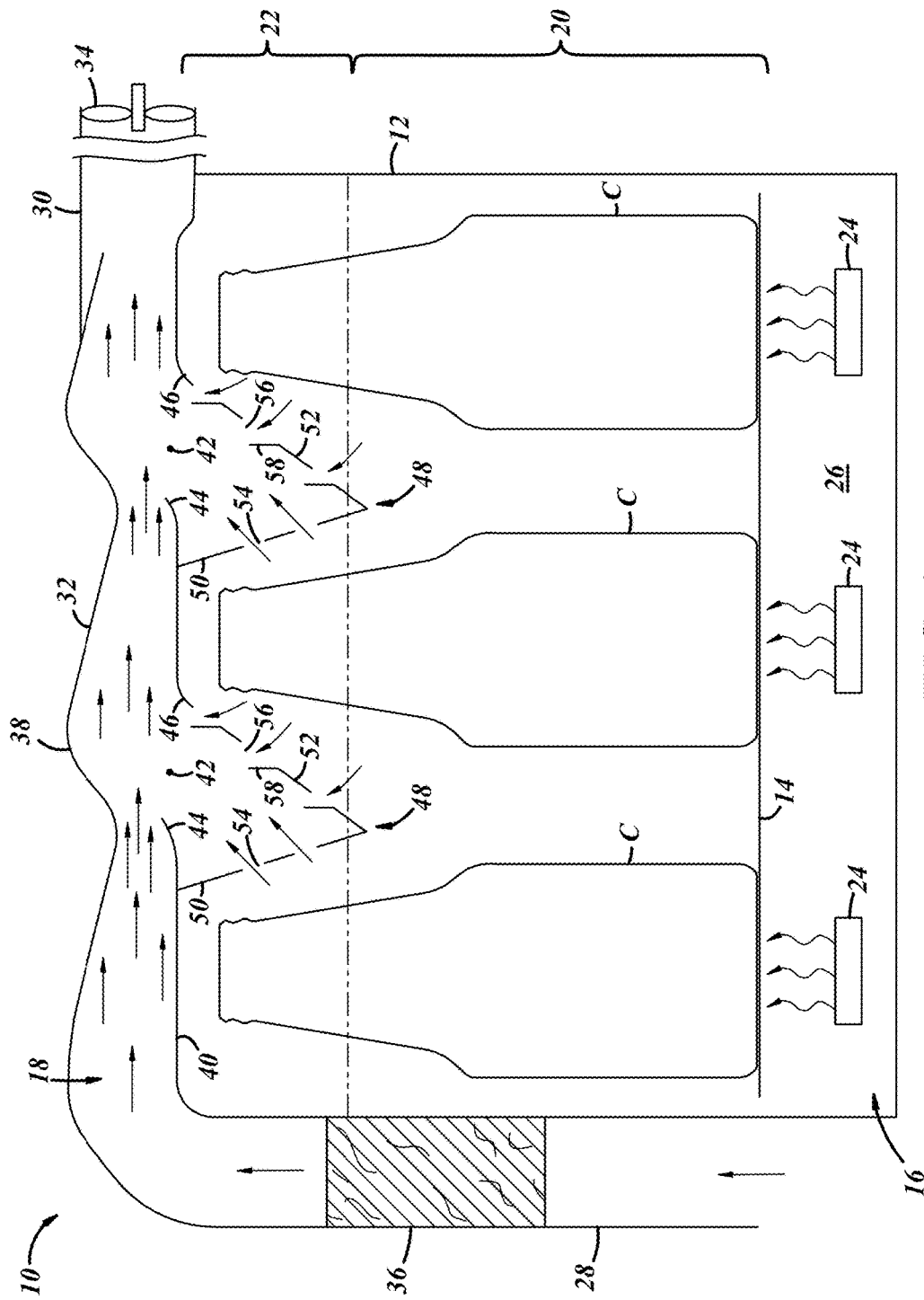
FIG. 1 is a schematic illustration of a transverse sectional view of an apparatus for imparting coloration to a glass container in accordance with an illustrative embodiment of the present disclosure.

FIG. 1 illustrates a transverse cross-sectional view of an apparatus 10 for imparting coloration to one or more glass containers C having a strikable glass container composition (i.e., a strikable glass container), in accordance with an illustrative embodiment of the present disclosure. The apparatus 10 includes an elongated tunnel 12 having an interior that extends through the apparatus 10, from an inlet to an outlet thereof, and a conveyor 14 that supports and advances the one or more glass containers C in a longitudinal direction through the interior of the tunnel 12, perpendicular to the plane of the cross-section of the apparatus 10. The glass containers C can be arranged on the conveyor 14 in the form of a spaced-apart array, which may include any general accumulation of multiple containers in any kind of order. For example, the glass containers C can be arranged on the conveyor 14 in a column and row type of arrangement. In addition, although FIG. 1 depicts a single row of glass containers C advancing through the tunnel 12, in other embodiments, multiple rows of multiple glass containers C may advance through the tunnel at a time, or multiple glass containers C may advance through the tunnel 12 in single file.

The apparatus 10 may be adapted for use in a continuous glass container manufacturing facility, and may be positioned downstream of the glass container forming operations and upstream of the glass container inspection operations. In one example, the apparatus 10 may be adapted for use as part of the glass container annealing operation.

A heating system 16 and a cooling system 18 are employed in the apparatus 10 to control the temperature in the interior of the tunnel 12 and thereby control the temperature to which the glass containers C are exposed as the containers C are passed through the tunnel 12. The heating system 16 supplies heat to the tunnel 12 and the cooling system 18 is configured to vent air out of the tunnel 12 and/or to locally supply cooling air to the tunnel 12. For example, the heating system 16 may be configured to selectively and locally supply heat to a lower region 20 of the tunnel 12, and the cooling system 18 may be configured to selectively and locally vent air out of an upper region 22 of the tunnel 12 or to supply cooling air to the upper region 22 of the tunnel 12 to establish a temperature differential between the lower and upper regions 20, 22 of the tunnel 12.

The heating system 16 includes heaters 24 that supply thermal energy to the interior of the tunnel 12. The heaters 24 may be located within a chamber 26 that extends underneath the conveyor 14 and is in thermal communication with the tunnel 12. The conveyor 14 is perforated so that the heat generated by the heaters 24 can be effectively and efficiently transferred from the chamber 26 to the lower region 20 of the tunnel 12, e.g., by forced convection and/or by radiation. In other embodiments, the heaters 24 may be positioned above the conveyor 14, beside the conveyor 14, and/or above the glass containers C themselves. The heating system 16 may be powered by natural gas, electricity, or by any other suitable source of energy.

The cooling system 18 includes an intake conduit 28 and an exhaust conduit 30 that are in fluid communication with the tunnel 12 via a plenum 32 that may extend in a generally transverse direction across the tunnel 12, above the glass containers C. In other embodiments, the plenum 32 may be positioned below the glass containers C. A blower 34 may be used to generate a generally horizontal and relatively cool gaseous flow through the plenum 32, from the intake conduit 28 to the exhaust conduit 30. The cooling system 18 may be configured to establish a positive or negative pressure in the plenum 32 relative to the interior of the tunnel 12, depending on whether it is desirable for the cooling system 18 to cool the interior of the tunnel 12 by venting air out of the tunnel 12 or by locally supply cooling air to the interior of the tunnel 12. A filter 36 may be placed within the intake conduit 28 to separate various particulate materials from the gaseous flow before it is swept through the plenum 32. The gaseous flow may consist of relatively cool air or another relatively cool gaseous medium, e.g., exhaust gas, chilled gas or chilled air.

The plenum 32 of the cooling system 18 has a top 38 and a bottom 40. The top 38 of the plenum 32 may have an undulating profile, which may be configured to locally increase and/or decrease the pressure and/or velocity of the gas flowing through the plenum 32. The bottom 40 of the plenum 32 has openings 42 that allow air and/or other gases to pass between the tunnel 12 and the plenum 32. The openings 42 in the bottom 40 of the plenum 32 may have curved upstream and downstream edges 44, 46. The upstream edges 44 of the openings 42 may be curved in a generally upward direction, towards the top 38 of the plenum 32, and the downstream edges 46 may be curved in a generally downward direction, away from the plenum 32, which may allow for a more uniform exchange of gas between the plenum 32 and the tunnel 12.

Perforated partitions, extensions, or covers 48 may be provided adjacent to or over the openings 42 to help guide and/or regulate the flow of air and/or other gases between the tunnel 12 and the plenum 32. The covers 48 also may allow for the selective and localized cooling of one or more predetermined regions of the tunnel 12. In some embodiments, the covers 48 may be carried by the plenum 32, and the openings 42 in the bottom 40 of the plenum 32 may be at least partially shielded by the covers 48. In the embodiment illustrated in FIG. 1, the covers 48 extend from the plenum 32 partway into the interior of the tunnel 12.

The covers 48 include first and second guides 50, 52 having proximal ends and distal ends. The first and second guides 50, 52 may be attached to or coupled to the bottom 40 of the plenum 32 at their proximal ends and may come together at their distal ends to form a "V". The proximal ends of the first and second guides 50, 52 are disposed on opposite sides of the openings 42 in the plenum 32. The distal ends of the first and second guides 50, 52 extend away from the plenum 32 into the tunnel 12, and may extend into the upper region 22 of the tunnel 12 at a location between and below top portions of the containers C to partially partition the upper region 22 of the tunnel 12 into sections.

The first guides 50 include slots 54 and the second guides 52 include apertures 56 with fins, slats, or louvers 58 that extend in a generally vertical direction from the second guides 52 towards the plenum 32. In combination, the first and second guides 50, 52 may allow for a more even and horizontally uniform exchange of air or another gaseous medium across the tunnel 12, from one side of the tunnel 12 to the other.

Although not illustrated in the drawings, the cooling system 18 may be used separately from the remaining components of the apparatus 10 and incorporated into other high temperature environments to selectively and locally cool certain regions of those environments, for example, to produce a vertical temperature profile therein. Some specific examples of other high temperature environments in which the cooling system 18 may be incorporated include the design of a conventional annealing lehr, a conveyor oven, or a batch oven. In some embodiments, the cooling system 18 may be incorporated into an overhead region of a heated chamber, enclosure, or vessel.

The heating system 16 and the cooling system 18 can be used in combination to create a vertical temperature profile within the interior of the tunnel 12. The vertical temperature profile may be configured to allow for selective parts, regions, or portions of the glass containers C to undergo a visible color change as the glass containers C are passed through the tunnel 12, and may include temperatures within two or more general temperature ranges. A first range may include temperatures that will not affect a color change within the glass containers C, i.e., temperatures that are below a minimum glass container striking temperature of the glass containers C. A second range may include temperatures that will affect some degree of a color change within the glass containers C but will not result in a full color change, i.e., temperatures that are within a partial glass container striking temperature range. A third range may include temperatures that will affect a full color change within the glass containers C, i.e., temperatures that are within an optimum glass container striking temperature range.

In the embodiment illustrated in FIG. 1, a relatively hot zone is locally established within the lower region 20 of the tunnel 12, a relatively cool zone is locally established within the upper region 22 of the tunnel 12, and an intermediate zone is established between the relatively hot and the relatively cool zones. The relatively hot zone is locally heated to a temperature within the optimum glass container striking temperature range, while the relatively cool zone is locally cooled and maintained at a temperature below the minimum glass container striking temperature. For example, the relatively hot zone may be heated to a temperature above 550 degrees Celsius. This may include heating the relatively hot zone to a temperature in the range of 550 degrees Celsius to 675 degrees Celsius, including all ranges and subranges therebetween. At the same time, the relatively cool zone may be maintained at a temperature between 10 degrees Celsius and 150 degrees Celsius below the temperature of the relatively hot zone, including all ranges and subranges therebetween. For example, the relatively cool zone may be maintained at a temperature below 575 degrees Celsius. In some embodiments, the relatively cool zone may be maintained at a temperature in the range of 375 degrees Celsius to 550 degrees Celsius. The intermediate zone may include a gradient of temperatures ranging from the temperature of the relatively hot zone to the temperature of the relatively cool zone. As such, one or more regions of the intermediate zone may be at a temperature within the partial glass container striking temperature range. For example, the intermediate zone may be at a temperature in the range of 425 degrees Celsius to 625 degrees Celsius, including all ranges and subranges therebetween.

The temperature of the relatively hot zone may be established by controlling the amount of heat that is locally supplied to the lower region 20 of the tunnel 12 by the heaters 24. The temperature of the relatively cool zone may be established by locally venting air and/or other gases out of the upper region 22 of the tunnel 12 or by locally supplying cooling air and/or another cooling gas to the upper region 22 of the tunnel 12. The temperature of the intermediate zone may be established by simultaneous control and/or adjustment of the temperatures in the relatively hot and cool zones, or by directly heating or cooling the intermediate zone using any suitable means.

Figure 2:
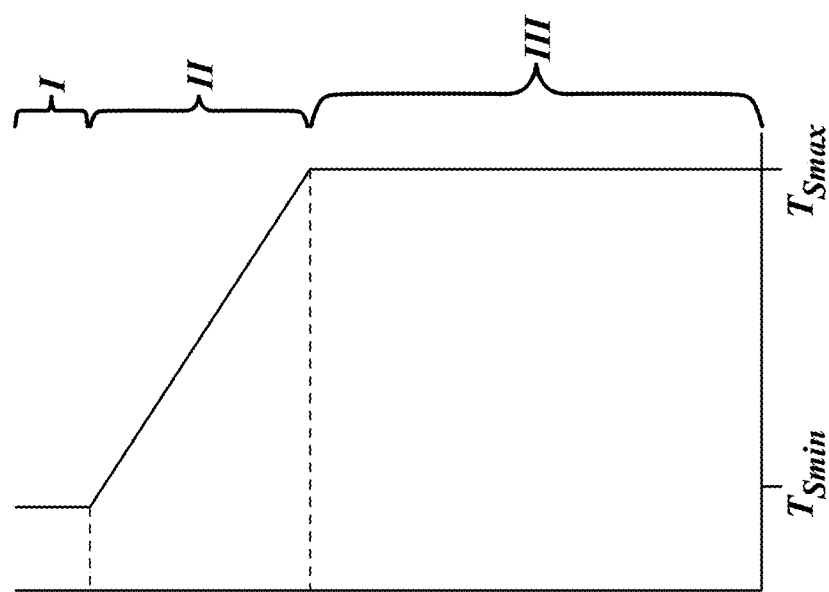
FIG. 2 is a plot of a desired vertical temperature profile for the apparatus of FIG. 1.

FIG. 2 provides a graphical illustration of a vertical temperature profile that may be established within the tunnel 12 of FIG. 1. The temperature profile includes three temperature zones: a relatively cool zone (I), an intermediate zone (II), and a relatively hot zone (III). The relatively cool zone (I) is at a temperature below a minimum glass container striking temperature ($T<T_{Smin}$), and will not affect a color change in the glass containers C. The relatively hot zone (III) is at or close to an optimum or maximum glass container striking temperature ($T \cong T_{Smax}$), and will affect a full color change within the glass containers C. The intermediate zone (II) includes a gradient of temperatures between the temperature of the relatively cool zone (I) and the temperature of the relatively hot zone (III). The temperatures within the intermediate zone (II) are within a partial glass container striking temperature range ($T_{Smin} \leq T < T_{Smax}$), and thus will affect some degree of color change within the glass containers C but will not result in a full color change. In some embodiments, the intermediate temperature zone (II) may be minimized or even eliminated, for example, by precise control of the temperatures of the hot zone (III) and the cool zone (I) within the tunnel 12.

Coloration can be imparted to the glass containers C by passing the glass containers C through the interior of the tunnel 12 in a manner which allows the glass containers C to be exposed to the temperature profile within the interior of the tunnel 12 for a sufficient amount of time for one or more selective portions of the glass containers C to undergo a visible color change. This coloration process may be referred to as "striking," and may be performed before the glass containers C are annealed, after the glass containers C are annealed, or during the annealing process itself. In some embodiments, heating or cooling air may be directed at one or more discrete portions of the glass containers C as the glass containers C are being passed through the interior of the tunnel 12 to affect a more precise or specific color change within the glass containers C, as will be discussed further below.

If the coloration process is performed after the glass containers C have already been annealed, then it may be desirable to slowly reduce the temperature of the glass containers C after the coloration process is performed to a temperature below the strain point of the glass. This may include gradually cooling the glass containers C down to a temperature in the range of 120 degrees Celsius to 140 degrees Celsius, including all ranges and subranges therebetween. The temperature of the glass containers C may be brought down gradually after the coloration process, for example, according to an annealing schedule to avoid fracture or failure of the containers C.

In some embodiments, the coloration process may be performed between the time the annealing process begins and the time the annealing process ends. In one example, the apparatus 10 may be separate from and used off line adjacent to an annealing lehr. In another example, the apparatus 10 may be incorporated into the design of the annealing lehr.

Figure 3:
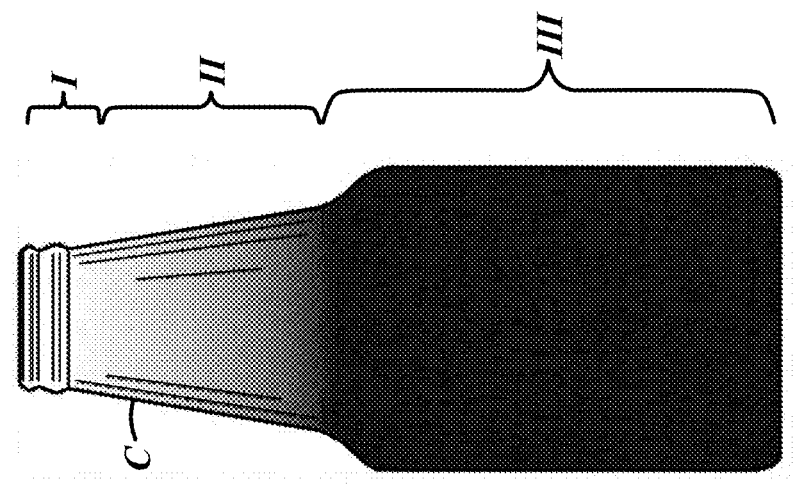
FIG. 3 is a side elevation view of a glass container having a desired coloration in accordance with an illustrative embodiment of the present disclosure.

FIG. 3 illustrates a glass container C that has been exposed to the vertical temperature profile of FIG. 2 for a sufficient amount of time to impart a desired coloration to the glass container C, e.g., between 5 minutes and 60 minutes, including all ranges and subranges therebetween. The glass container C includes a generally colorless unstruck portion (I), a partially struck portion (II) that exhibits a color gradient, i.e., color that gradually transitions from dark to light or vice versa, and a fully struck portion (III) that exhibits a substantially uniform color. As shown, the partially struck portion (II) and the fully struck portion (III) of the glass container C each comprise a portion of the glass container C that is less than the whole glass container C.

Figure 4:
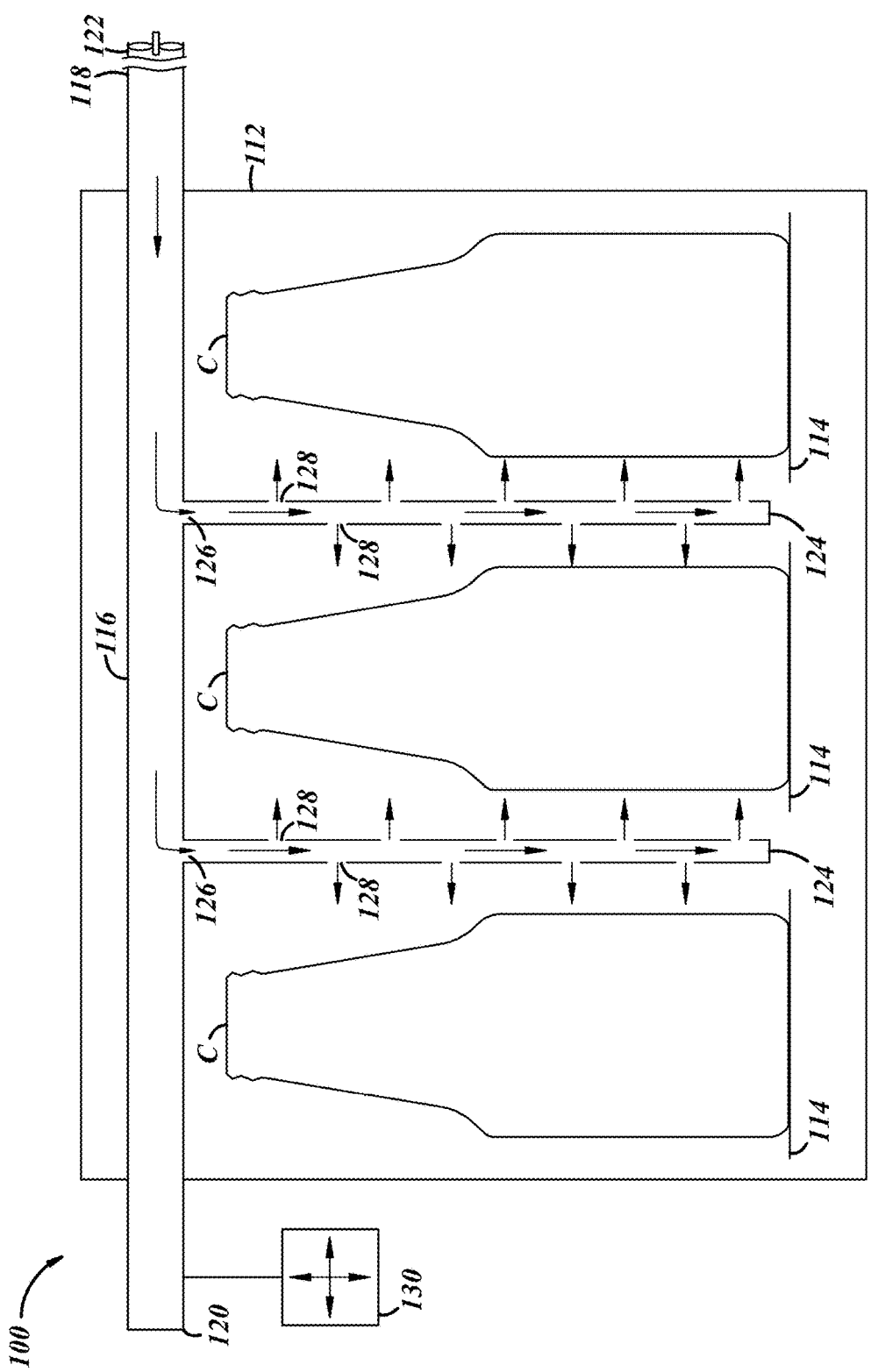
FIG. 4 is a schematic illustration of a transverse sectional view of an apparatus for imparting coloration to a glass container in accordance with another embodiment of the present disclosure.

FIG. 4 illustrates a transverse cross-sectional view of another apparatus 100 that can be used to impart coloration to one or more strikable glass containers C, in accordance with another illustrative embodiment of the present disclosure. Like the apparatus 10, the apparatus 100 includes an elongated tunnel 112 having an interior that extends through the apparatus 100, in a direction from an inlet toward an outlet thereof. The glass containers C may be supported by and advanced in a longitudinal direction through the interior of the tunnel 112 on individual platforms 114, which may be configured to rotate the glass containers C as the containers C are being passed through the interior of the tunnel 112. In other embodiments, the glass containers C may be supported on one or more conveyors or by any other suitable device.

A plenum 116 extends in a generally transverse direction across the interior of the tunnel 112, from an open end 118 to a closed end 120 thereof. A blower 122 may be used to generate a generally horizontal gaseous flow through the plenum 116, from the open end 118 to the closed end 120, and to establish a positive pressure in the plenum 116 relative to the interior of the tunnel 112 so that gases flow from the plenum 116 into the interior of the tunnel 112. The plenum 116 is in fluid communication with the interior of the tunnel 112 via one or more manifolds 124, and has one or more openings 126 through which air and/or another gaseous medium can flow between the plenum 116 and the one or more manifolds 124.

The manifolds 124 extend from the plenum 116 at least partway into the interior of the tunnel 112 and have orifices 128 through which air and/or another gaseous medium can flow between the plenum 116 and the interior of the tunnel 112. The manifolds 124 may have elongated bodies with open proximal ends coupled to the plenum 116 and closed distal ends extending away from the plenum 116. Each of the orifices 128 is configured to direct a gaseous flow from the plenum 116, through one or more of the manifolds 124 and at a discrete portion of one or more of the glass containers C. The orifices 128 may be of the same or different sizes and may be regularly or randomly spaced apart from one another. For example, the orifices 128 near the proximal ends of the manifolds 124 may be smaller or larger and/or present in a higher or lower concentration than the orifices 128 near the distal ends of the manifolds 124, or vice versa. In some embodiments, one or more of the manifolds 124 may be positioned side-by-side and/or coupled to one another to form a gauntlet.

The temperature of the gaseous flow in the plenum 116 may be relatively cool or relatively hot compared to the temperature in the interior of the tunnel 112, and a relatively hot or relatively cool gaseous flow can be directed from the manifolds 124, through the orifices 128 and at one or more discrete portions of the glass containers C to impart coloration to the glass containers C. For example, a relatively hot or relatively cool gaseous flow can be directed from the manifolds 124, through the orifices 128 and at one or more discrete portions of the glass containers C to affect a color change or to prevent a color change from occurring in the one or more discrete portions of the glass containers C. In some embodiments, a relatively cool gaseous flow can be directed from the manifolds 124, through the orifices 128 at the one or more discrete portions of the glass containers C to halt or limit the degree of color change, for example, to stop a color change prior to completion resulting in a partial color change in the one or more discrete portions of the glass containers C.

The orifices 128 may be arranged in a predetermined pattern in each of the manifolds 124 to affect a desired temperature profile around each of the glass containers C, and thereby impart a desired coloration to the glass containers C. Accordingly, the apparatus 100 may be used to produce glass containers having random or regularly patterned colored portions of the same or different color values or lightness. In some embodiments, the apparatus 100 may be used to produce glass containers having a mottled appearance by varying the temperatures of different portions of the glass containers C.

In embodiments where the temperature in the interior of the tunnel 112 is maintained below a minimum glass container striking temperature, a relatively hot gaseous flow having a temperature at or above the glass container striking temperature can be directed from one of the manifolds 124, through one of the orifices 128 and at a discrete portion of one of the glass containers C for a sufficient time to affect a color change therein.

Those of ordinary skill in the art will recognize that the plenum 116 and/or one or more of the manifolds 124 may be moved relative to the glass containers C by a powertrain 130 of any type suitable for imparting motion thereto. For example, the powertrain 130 may include an electric motor or other prime mover, linkages between the prime mover and the manifolds 124 and/or plenum 116, as well as suitable controls, sensors, and the like.

In other embodiments, where the temperature in the interior of the tunnel 112 is maintained at or above a glass container striking temperature, a relatively cool gaseous flow having a temperature below the glass container striking temperature can be directed from one of the manifolds 124, through one of the orifices 128 and at a discrete portion of one of the glass containers C to ensure that the discrete portion remains below the glass container striking temperature and does not change color as the glass containers C are passed through the interior of the tunnel 112. Portions of the glass containers C that are not exposed to the relatively cool gaseous flow from the manifold 124 will be heated to a temperature at or above the glass container striking temperature and will change color as the glass containers C are passed through the interior of the tunnel 112.

The plenum 116 and/or the manifolds 124 may be movable relative to the glass containers C to provide flexibility to the coloration process. For example, the plenum 116 and/or the manifolds 124 may be movable in a vertical direction and/or in a horizontal direction so that the plenum 116 and/or the manifolds 124 are either closer to or further from the glass containers C. In some embodiments, the plenum 116 and/or the manifolds 124 can be moved during the coloration process so that a gaseous flow from one of the orifices 128 can be sequentially directed at multiple discrete portions of one or more of the glass containers C, thereby allowing for the production of multiple different color patterns in the glass containers C using a single manifold 124 having a single orifice 128. In other embodiments, the plenum 116 and the manifolds 124 may be configured to follow a predetermined pattern, e.g., a figure eight pattern, and the glass containers C may be timed to pass through the interior of the tunnel 112 so that the glass containers C are exposed to a desired temperature profile as they pass through the tunnel 112 to impart a desired coloration to the glass containers C.

There thus has been disclosed an apparatus and a process for imparting coloration to a glass container after the container has been formed, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. In addition, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A process for imparting coloration to a glass container that includes:
    (a) providing a glass container having a strikable glass container composition; and
    (b) exposing a selective portion of said glass container to a temperature at or above a glass container striking temperature for a time sufficient to affect a color change in at least said selective portion of said glass container.

2. The process set forth in claim 1 wherein said step (b) does not result in a color change in at least one other portion of said glass container.

3. The process set forth in claim 1 wherein said step (b) includes exposing said selective portion of said glass container to a temperature above 550 degrees Celsius.

4. The process set forth in claim 1 wherein said step (b) includes exposing said selective portion of said glass container to a temperature at or above a glass container striking temperature for a time sufficient to establish a temperature gradient in said glass container and to produce a gradient of color in said glass container.

5. The process set forth in claim 1 wherein said step (b) includes passing said glass container through an interior having a vertical temperature profile that includes a relatively hot zone and a relatively cool zone.

6. The process set forth in claim 5 wherein said relatively hot zone is established by locally heating a lower region of said interior.

7. The process set forth in claim 5 wherein said relatively cool zone is established by locally venting an upper region of said interior at a location below a top portion of said glass container or by locally supplying a cooling gas to an upper region of said interior at a location below a top portion of said glass container.

8. The process set forth in claim 5 wherein said relatively cool zone is established by generating a gaseous flow through a plenum.

9. The process set forth in claim 1 that also includes:
    after said step (b), gradually cooling said glass container to a temperature below a strain point of the glass container composition.

10. The process set forth in claim 1, wherein said step (b) includes heating a first portion of said glass container to a predetermined temperature and simultaneously cooling a second portion of said glass container to a temperature below the predetermined temperature.

11. The process set forth in claim 1, wherein said step (b) includes flowing a gaseous medium through at least one orifice of a manifold in fluid communication with an opening in a plenum.

12. The process set forth in claim 1, wherein said step (b) includes flowing gasses through a plenum and through a perforated cover for the plenum.

13. A process for imparting coloration to a glass container that includes:
    (a) providing a glass container having a strikable glass container composition;
    (b) introducing said glass container into an environment having a substantially uniform temperature; and
    (c) locally heating or cooling discrete portions of said glass container to affect a color change or to prevent a color change from occurring in said discrete portions of said glass container.

14. The process set forth in claim 13 wherein said step (b) includes introducing said glass container into an environment having a temperature below a glass container striking temperature, and said step (c) includes locally heating said discrete portions of said glass container to a temperature above said glass container striking temperature.

15. The process set forth in claim 14 wherein said step (c) includes locally directing a gaseous flow having a temperature at or above said glass container striking temperature at said discrete portions of said glass container to affect a color change in said discrete portions.

16. The process set forth in claim 13 wherein said step (b) includes introducing said glass container into an environment having a temperature at or above a glass container striking temperature, and said step (c) includes locally cooling said discrete portions of said glass container to maintain said discrete portions at a temperature below said glass container striking temperature.

17. The process set forth in claim 16 wherein said step (c) includes locally directing a gaseous flow having a temperature below said glass container striking temperature at said discrete portions of said glass container to prevent a color change from occurring in said discrete portions of said glass container.

18. The process set forth in claim 13, wherein said step (c) includes heating a first portion of said glass container to a predetermined temperature and simultaneously cooling a second portion of said glass container to a temperature below the predetermined temperature.

19. The process set forth in claim 13, wherein said step (c) includes flowing a gaseous medium through at least one orifice of a manifold in fluid communication with an opening in a plenum.

20. The process set forth in claim 13, wherein said step (c) includes flowing gasses through a plenum and through a perforated cover for the plenum.

* * * * *